United States Patent
Queva et al.

(10) Patent No.: US 10,140,135 B2
(45) Date of Patent: Nov. 27, 2018

(54) METHOD FOR EXECUTING A COMPUTER PROGRAM WITH A PARAMETERISED FUNCTION

(71) Applicant: COMMISSARIAT A L'ENERGIE ATOMIQUE ET AUX ENERGIES ALTERNATIVES, Paris (FR)

(72) Inventors: Caroline Queva, Pontcharra (FR); Damien Courousse, Grenoble (FR); Yves Lhuillier, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/740,169

(22) PCT Filed: Jun. 28, 2016

(86) PCT No.: PCT/FR2016/051584
§ 371 (c)(1),
(2) Date: Dec. 27, 2017

(87) PCT Pub. No.: WO2017/001754
PCT Pub. Date: Jan. 5, 2017

(65) Prior Publication Data
US 2018/0189085 A1    Jul. 5, 2018

(30) Foreign Application Priority Data

Jun. 29, 2015 (FR) ..................................... 15 56098

(51) Int. Cl.
*G06F 9/45*        (2006.01)
*G06F 9/455*       (2018.01)
*G06F 8/41*        (2018.01)

(52) U.S. Cl.
CPC ............ *G06F 9/45516* (2013.01); *G06F 8/41* (2013.01); *G06F 8/49* (2013.01)

(58) Field of Classification Search
CPC .... G06F 8/20; G06F 11/3612; G06F 11/3624; G06F 11/3636; G06F 8/311; G06F 9/445; G06F 9/4484
See application file for complete search history.

(56) References Cited

U.S. PATENT DOCUMENTS 5,995,754 A    11/1999 Holzle et al.
6,237,141 B1    5/2001 Holzle et al.
(Continued)

FOREIGN PATENT DOCUMENTS

EP    0 908 819 A2    4/1999

OTHER PUBLICATIONS

Wei Tao et al.; Secure Dynamic Code Generation Against Spraying; ACM; pp. 738-740; <https://dl.acm.org/citation.cfm?id=1866415> (Year: 2010).*

(Continued)

*Primary Examiner* — Geoffrey R St Leger
*Assistant Examiner* — Cuong V Luu
(74) *Attorney, Agent, or Firm* — Oblon, McClelland, Maier & Neustadt, L.L.P.

(57) ABSTRACT

A method for executing a program including updating a value of a first counter each time a parameterized function is implemented with a first specific value of a parameter; checking whether the value of the first counter exceeds a first precalculated threshold, and in response, generating a specialized code for this function; and executing the preceding operations replacing the first specific value, the first counter, and the first precalculated threshold by a second specific value, a second counter and a second precalculated threshold, respectively; the first precalculated threshold being (Continued)

calculated on the basis of an execution outlay when the first specific value is used, the second precalculated threshold being calculated on the basis of an execution overlay when the second specific value is used.

10 Claims, 2 Drawing Sheets

(56) References Cited

U.S. PATENT DOCUMENTS

| | | | |
|---|---|---|---|
| 6,427,234 | B1 | 7/2002 | Chambers et al. |
| 6,907,597 | B1* | 6/2005 | Mamona ............. G06F 9/44505 717/121 |
| 7,240,340 | B2* | 7/2007 | Vaidyanathan ........... G06F 8/20 717/110 |
| 7,703,081 | B1* | 4/2010 | Buches ................... G06F 21/52 717/127 |
| 2004/0205712 | A1 | 10/2004 | Holzle et al. |
| 2009/0024986 | A1* | 1/2009 | Meijer ...................... G06F 8/41 717/137 |
| 2010/0095284 | A1 | 4/2010 | Herring et al. |
| 2016/0019037 | A1* | 1/2016 | Varga ...................... G06F 8/443 717/151 |
| 2016/0085520 | A1* | 3/2016 | Zhao .......................... G06F 8/35 717/105 |

OTHER PUBLICATIONS

Yongfeng Niu et al.; Ternary Linear Codes with Few Weights from Functions with Two Variables; ACM; pp. 22-27; <https://dl.acm.org/citation.cfm?id=3058066> (Year: 2017).*

Jun Sakuma et al.; Latent Variable Crossover for k-tablet Structures and its Application to Lens Design Problems; ACM; pp. 1347-1354; <https://dl.acm.org/citation.cfm?id=1068226> (Year: 2005).*

Hemanth Makkapati et al.; Domain-driven Technique for Functionality Identification in Source Code; ACM; 8 pages; <https://dl.acm.org/citation.cfm?id=2180923> (Year: 2012).*

Bryant A. Julstrom et al.; Comparing Decoding Algorithms in a Weight Coded GA for TSP; ACM; pp. 313-317; <https://dl.acm.org/citation.cfm?id=330830> (Year: 1998).*

Jay Abraham et al.; Improving Quality of Ada Software with Range Analysis; ACM; 1 page; <https://dl.acm.org./citation.cfm?id=2070342> (Year: 2011).*

International Search Report dated Sep. 15, 2016, in PCT/FR2016/051584 filed Jun. 28, 2016.

Matthew Arnold et al., "Adaptive Optimization in the jalapeno JVM", OOPSLA '00, PLDI09: Proceedings of the 2009 ACM SIGPLAN Conference on Programming Language Design and Implementation, vol. 35, No. 10, Oct. 2000, 19 pages.

Markus Mock et al., "Calpa: A Tool for Automating Dynamic Compilation", Proceedings of the Second Workshop on Feedback-Directed Optimization in conjunction with MICRO-32, Nov. 15, 1999, 10 pages.

Mihai Burcea et al., "A Runtime Optimization System for OpenMP", OPENMP Shared Memory Parallel Programming Lecture Notes in Computer Science, Jan. 1, 2003, 12 pages.

Kim Hazelwood Cettei, "Code Cache Management in Dynamic Optimization Systems", The Division of Engineering and Applied Sciences, Harvard University, May 2004, 111 pages.

Charles Consel et al., "A General Approach for Run-Time Specialization and its Application to C", POPL '96, Proceedings of the $23^{rd}$ ACM SIGPLAN-SIGACT Symposium on Principles of Programming Languages, 1996, 12 pages.

Mark Leone et al., "Lightweight Run-Time Code Generation", Proceedings of the ACM SIGPLAN Workshop on Partial Evaluation and Semantics-Based Program Manipulation, Jun. 1994, 10 pages.

Mark Leone et al., "Dynamic Specialization in the Fabius System", Computing Surveys Symposium on Partial Evaluation, 1998, 6 pages.

Brian Grant et al., "DyC: An Expressive Annotation-Directed Dynamic Compiler for C", Theoretical Computer Science, vol. 248, Issue 1-2, 2000, 22 pages.

Igor Costa et al., "Just-in-Time Value Specialization", IEEE, CGO '13, Feb. 23-27, 2013, 11 pages.

Henri-Pierre Charles et al.,"deGoal a Tool to Embed Dynamic Code Generators into Applications", A. Cohen (Ed.): CC 2014, LNCS 8409, 2014, 6 pages.

Christian Haelibl et a., "Trace-based Compilation for the Java HotSpot Virtual Machine", PPPJ '11, Aug. 24-26, 2011, 10 pages.

Michael Bebenita et al., "SPUR: A Trace-Based JIT Compiler for CIL", Microsoft Research Technical Report MSR-TR-2010-27, Mar. 26, 2010, 17 pages.

Andreas Gal et al, "Trace-based Just-in-Time Type Specialization for Dynamic Languages", PLDI '09, Jun. 15-20, 2009, 14 pages.

Andreas Gal et al, "HotpathVM: An Effective JIT Compiler for Resource-constrained Devices", VEE '06, Jun. 14-16, 2006, 10 pages.

Dries Buytaert et al., "Using HPM-Sampling to Drive Dynamic Compilation", OOPSLA '07, Oct. 21-25, 2007, 15 pages.

Derek Bruening et al., "An Infrastructure for Adaptive Dynamic Optimization", Institute of Electrical and Electronics Engineers , 2003, 11 pages.

Wei Chen et al.. "An Approach to Minimizing the Interpretation Overhead in Dynamic Binary Translation", J. Supercomput, 2012, (Published online: Jun. 22, 2011), 30 pages.

Jason D. Hiser et al., "Evaluating Indirect Branch Handling Mechanisms in Software Dynamic Translation Systems", ACM Transactions on Architecture and Code Optimization (TACO), 2011,13 pages.

Ming Jia et al., "SPIRE: Improving Dynamic Binary Translation through SPC-indexed Indirect Branch Redirecting", VEE '13, Mar. 16-17, 2013, 11 pages.

Kevin Casey et al., "Optimizing Indirect Branch Prediction Accuracy in Virtual Machine Interpreters", ACM Transactions on Programming Languages and Systems, Received Oct. 2005; revised Oct. 2006; accepted Mar. 2007, 35 pages.

Evelyn Duesterwald et al., "Software Profiling for Hot Path Prediction: Less is More", ACM SIGPLAN Notices. vol. 35, No. 11, 2000, 11 pages.

Seong-Won Lee et al., "Enhanced Hot Spot Detection Heuristics for Embedded Java Just-in-Time Compilers", LCTES '08, Jun. 12-13, 2008, 10 pages.

Charles Aracil et al., "Software Acceleration of Floating-point Multiplication using Runtime Code Generation", 2013 4th Annual International Conference on Energy Aware Computing Systems and Applications (ICEAC), 2013, 6 pages.

* cited by examiner

| If | 3 | @f - V0, V1 | V0 | V1 | | |
|---|---|---|---|---|---|---|
| If | 3 | @f - V0, V2 | V0 | V2 | | |
| If | 3 | @f - V3, V4 | V3 | V4 | | |
| If | 3 | @f - V0, V4 | V0 | V4 | | |
| Ig | 2 | @g - V5, pg2, pg3 | V5 | | | |
| Ig | 2 | @g - V0, pg2, pg3 | V0 | | | |

| | | | |
|---|---|---|---|
| 1 | main | 1 | Procedure Lookup_spec (Id, value) |
| 2 | { | 2 | Compare (If, elem0) |
| 3 | f (2, 10); | 3 | branch @If_elem0 |
| 4 | f (5, 10); | 4 | Compare (If, elem1) |
| 5 | for (1 = 0; i < 15; i++) | 5 | branch @If_elem1 |
| 6 | { | 6 | ... |
| 7 | f (2, 12); | 7 | Compare (Ig, elemX) |
| 8 | } | 8 | branch @Ig_elemX |
| 9 | for (1 = 0; i < 5; i++) | 9 | Compare (If) |
| 10 | { | 10 | branch @f |
| 11 | f (5, 14); | 11 | ... |
| 12 | } | | |
| 13 | } | | |

METHOD FOR EXECUTING A COMPUTER PROGRAM WITH A PARAMETERISED FUNCTION

The invention relates to a method for executing a computer program including a parameterized function capable of being executed one or more times during the execution of the program. The invention also relates to an information recording medium, a computer program, and a central unit for implementing this method.

The parameterized functions include at least one parameter the value of which is obtained at the instant when the function is called in order to be executed by a microprocessor or during execution thereof by the microprocessor.

Known methods for executing such computer programs include:

a) providing a generic code for the function, in which code each parameter of the function is encoded as a variable such that this generic code does not itself contain the value of this parameter, but contains an operation of reading its value from an address specified by the generic code, b) verifying a condition, c) only if the condition is verified, generation, by the microprocessor, of a specialized code for this function, in the machine language of the microprocessor, and then recording this specialized code in a memory, this specialized code performing, when it is executed by the microprocessor, the same function as the generic code but, in the particular case where at least one parameter of the function is specialized with a first specific value, the specialization of a parameter of the function with the first specific value, consisting in assigning this specific value to this parameter and then in processing this parameter no longer as a variable but as a constant, such that the specialized code does not include any operation of reading its value from an address situated outside of the continuous range of addresses where this specialized code is recorded, d) next, when the function is performed with the first specific value of the parameter, if the specialized code is recorded in the memory, the microprocessor performs this function by directly executing the specialized code recorded in the memory without using the generic code for this function, and if not e) the microprocessor performs this function using its generic code.

In this description, the expression "reading the value of a parameter from an address" denotes the operation of reading the value of this parameter both in a memory and in a register. The term "address" thus denotes both an address in a memory and an identifier of a register in which the value of this parameter has to be read.

The specialized code for a function is executed at a lower cost than the generic code for this function, in particular because it has been able to be optimized on the basis of the known specific values of the parameters. The cost may be the execution time, electrical consumption, the electric power consumed, the temperature, or the level of electric or acoustic noise. For example, unlike the generic code, the specialized code does not include an operation of reading the value of the specialized parameters outside of the range of addresses where this specialized code is recorded. Thus, to perform the same function, the specialized code has fewer instructions than the generic code, or has less costly read instructions, for example if the read instructions are rearranged in order to access some of the local memory. If execution thereof requires less access to the memory, this will probably be quicker and therefore less costly. This is why, where possible, it is generally preferable to execute the specialized code rather than the generic code.

For example, such a method is disclosed in the following article:

M. Arnold et al.: "Adaptive optimization in the jalapeño JVM", ACM SIGPLAN Notices, vol. 46, no 4, pp 65-83, 2011.

Hereinafter, this article is referred to under the abbreviation "Arnold2011". This article teaches that it is desirable to trigger the generation of a specialized code if the following condition is verified: $C_J+T_J<T_I$, where:

$C_J$ is the time necessary to generate the specialized code, $T_J$ is the time necessary to execute the specialized code that is generated, and $T_I$ is the time necessary to execute the generic code for the function.

In other words, if the sum of the time for generating the specialized code and the time during which it will be executed in the future is strictly less than the time that will be necessary in the future to perform the function on the basis of the generic code, then the specialized code is systematically generated.

The quantities $C_J$, $T_J$ and $T_I$ depend on the parameterized function to be performed. Thus, the condition proposed in Arnold2011 has the advantage of being specific to each function of the program to be executed. This condition is therefore suitable for the parameterized function that is associated therewith. This enables greater flexibility in the decision to generate or not to generate specialized codes for the various parameterized functions of the program. The method from the article Arnold2011 therefore turns out to exhibit better performance that the known methods that use the same condition, regardless of the parameterized function. It thus makes it possible, more often than other known methods, to reduce the execution cost of the program. For example, it makes it possible to more effectively shorten the execution time of this program.

Prior art is shown known from:

U.S. Pat. No. 6,427,234B1,

Markus Mock et al.: "Calpa: A tool for Automating Dynamic Compilation", Proceedings of the Second Workshop on Feedback-directed Optimization in conjunction with Micro-32, Haifa, Israel, Nov. 15, 1999, pages 1-10;

Mihai Burcea et al.: "A Runtime Optimization System for OpenMP", OpenMP shared memory parallel programming lecture notes in computer science, Springer, Berlin, pages 42-53, Jan. 1, 2003;

US2010095284A1.

However, it is still desirable to improve the method from the article Arnold2011 in order to minimize a cost to an even greater extent, such as the execution time of the program, in the majority of cases liable to be encountered when this program is executed.

The invention therefore concerns such a method for executing a computer program as claimed in claim 1.

In the above method, even if the gap between the costs Klib and Kdyn is lower than the cost Kgen, the generation of a specialized code for the function is triggered if this function is liable to be executed a plurality of times. Thus, in this situation, the generation of the specialized code is not systematically prevented. This makes it possible, in the majority of cases, to speed up the execution of the program. Specifically, in this case, it is taken into account that the cost Kgen may be amortized not after just one execution of the specialized code, but only after a plurality of executions of this specialized code.

In addition, the claimed method retains the advantage of the method from Arnold2011. Specifically, the threshold is not defined arbitrarily but, by contrast, depends on the features of the function to be executed.

Lastly, managing counters and thresholds associated both with a function and with specific values of its parameters makes it possible to automatically define different thresholds for triggering the generation of the specialized code, depending on the specific value used to specialize the same parameter of the same function. By virtue of this, it is possible to trigger the generation of a specialized code only when the specific value used for this gives a specialized code that has benefit for reducing the cost, and not to trigger this generation if the specific value used for this gives a specialized code that has little benefit for reducing the cost. It is therefore possible to more finely optimize the execution of the program and reduce the execution cost of the computer program to an even greater extent.

The modes of implementation of the method may in addition have the following advantages:

Using one and the same threshold for all of the counters associated with one and the same parameterized function without taking account of the value of the parameters of this function makes it possible to limit the memory resources that are used to execute step b).

Calculating different thresholds for the counters associated with different parameterized functions makes it possible to trigger the generation of a specialized code for each different function by taking account of the specific features of this function. This therefore makes it possible to better optimize the generation of specialized code and therefore to reduce the execution cost of the program.

The invention also concerns an information recording medium and a computer program including instructions for executing the claimed method when these instructions are executed by a microprocessor.

Lastly, the invention concerns a central unit for executing a computer program.

The invention will be better understood on reading the following description, given merely by way of non-limiting example and with reference to the drawings, in which.

In these figures, the same reference numbers are used to denote the same elements. In the remainder of this description, features and functions that are well known to those skilled in the art are not described in detail.

In this description, an "instruction" denotes a machine instruction that is able to be executed directly by a microprocessor. Such an instruction typically consists:

of an opcode, or operation code, that encodes the nature of the operation to be executed, and of one or more operands defining the value(s) of the parameters of this operation.

A "binary code" or a "code written in machine language" is a set of machine instructions. This typically involves a file containing a succession of bits at the value "0" or "1", these bits encoding the instructions to be executed by the microprocessor. The binary code is able to be executed directly by the microprocessor, that is to say without the need for a preliminary compilation or interpretation.

Reference is made to execution of a function to denote the execution of the instructions performing this function.

For the sake of simplicity, in this description, the instructions are not shown in binary form, but rather in a symbolic form expressed in a machine or assembler language. In particular, the opcode is shown in a known manner by a mnemonic.

Figures 1, 2:
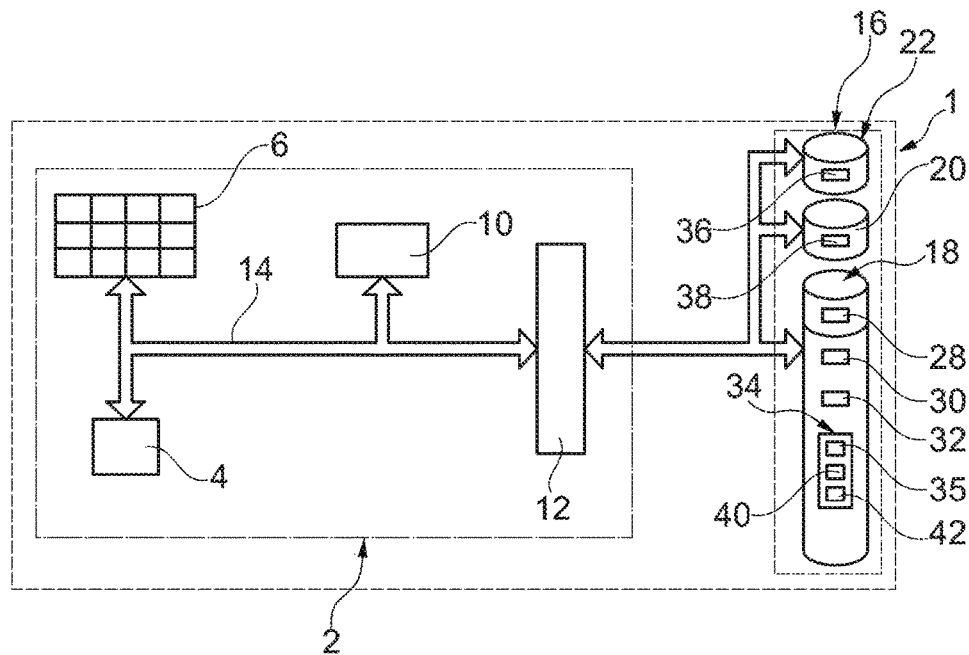
FIG. 1 is a schematic illustration of a central unit that is programmed to execute a computer program including parameterized functions.
FIG. 2 is a schematic illustration of the structure of a table used in the central unit of FIG. 1.

FIG. 1 shows an electronic central unit 1 including a microprocessor 2 and an information recording medium 16. This microprocessor 2 in this case includes:

an arithmetic and logic unit 4;

a set of registers 6;

a control module 10;

a data input/output interface 12 that makes it possible to access the medium 16 by way of a memory bus.

The medium 16 includes, for example:

a program memory 18 that is for example non-volatile, such as an EEPROM or Flash memory, and a random access memory 22, better known under the acronym "RAM", and a data memory 20.

These memories 18, 20 and 22 may be hardware memories that are separate from one another or software memories. The software memories correspond to different ranges of addresses, for example, within one and the same hardware memory. It may also involve a combination of hardware and software memories. In particular, the memory 22 is in this case a software cache memory and not a hardware cache memory.

The memories 18 and 22 are configured to store instructions to be executed by the unit 4. Typically, an ordinal counter, also called "instruction pointer", of the microprocessor 2 points to the location of the memory 18 or 22 containing the next instruction to be executed by the unit 4. The microprocessor 2 is in particular configured to execute the instructions stored in the memory 18 or 22, most of the time in the order in which these instructions are stored in these memories and, if necessary, to store the result of these executed instructions in one or more of the registers 6 or in the memory 20 or 22. In this case, it is considered that an instruction, in order to be executed by the unit 4, has to be situated in the memory 18 or 22. In this description, "execution by the microprocessor 2" and "execution by the unit 4" will be used as synonyms.

The module 10 is configured to move memory words between the registers 6, the medium 16 and the interface 12. It will be noted that the memory words recorded in the memory 22 are able to be processed, alternately, either as instructions or as data. To this end, the microprocessor in this case also includes a bus 14 for exchanging data and instructions. The interface 12 is in particular able to acquire data, for example from the memory 20 that is external to the microprocessor 2. In this embodiment, no distinction is made between the data bus and the instruction bus. These two types of bus are represented by the single bus 14.

In this embodiment, the memory resources that are used are highly limited. For example, the size of the memory 22 is smaller than 1 MB or 500 KB or 128 KB. For example, the memory 22 is a volatile memory.

Such a microprocessor 2 is well known to those skilled in the art and will not be described in detail. In this example, the microprocessor 2 is the microprocessor MSP430 marketed by Texas Instruments.

The memory 18 contains a program 28 to be executed. This may be a program that is able to control electronic peripheral devices, such as a human-machine interface or a printer. This may also be a program that is able to acquire data transmitted by electronic sensors and then process said data. This may also be a program that processes technical data, such as for example a computer-assisted simulation program. More generally, the teaching given here applies to any type of program that is executed by a microprocessor.

In this embodiment, by way of illustration, the program 28 is not written directly in the machine language of the microprocessor 2, but in an intermediate language that is independent of the specificities of the hardware architecture of the central unit 1 on which this program has to be executed. For example, the program 28 is written in Bytecode, such as Bytecode Java®.

The program 28 contains numerous parameterized functions. A parameterized function is a function that includes at least one parameter the value of which is obtained at the instant when this function is called in order to be executed by the microprocessor 2 or during execution thereof by the microprocessor 2. A parameter is frequently an argument of the function the value of which is obtained at the instant when this function is called in order to be executed by the microprocessor 2. It is then said that the parameter is explicit, as it features explicitly as an argument of the function the value of which has to be provided so that the function is able to be performed. This is the most common case for a parameterized function. However, there are also parameters that may not appear to be explicitly arguments of the function, but whose values are read in memory when this function is performed. This is for example the case for a global variable. Such a global variable is generally declared at the start of the program, and may be used within all of the functions of the program without it being necessary for this global variable to appear explicitly in the list of the arguments of these functions. For example, a global variable may be used to contain the size of an image or of a matrix. Another example of an implicit parameter is a variable intended to contain a value returned by a sub-function called by the function.

Since the values of be parameters are not known at the instant when the program is written, but only at the instant when it is executed, each parameter is encoded as a variable in the generic code for the parameterized function. The generic code for each parameterized function, which code is contained in the program 28, thus includes operations of reading the value of each parameter in a memory, before being able to process this parameter. For example, the value of the parameter is used, within the generic code for the function, as an operand for one or more operations to be performed. This may involve any operation. For example, these operations are arithmetic or Boolean operations, or operations of reading data from an address specified by the value of the parameter. The parameter may also be non-functional in nature. For example, it contains information regarding the features of the micro-architecture of the microprocessor 2 on which the program 28 will be executed.

A function corresponds to at least one basic block. A basic block is a succession of instructions to be executed systematically one after the other and that are therefore situated at consecutive addresses in the program memory 8 when they are loaded into this memory. A basic block comprises a single input point (first instruction of the block) and a single output point (the last instruction). This basic block terminates with a branch, that is to say a jump to a non-consecutive address of the program memory 10. The start of the basic block begins with an instruction to which a branch of the program points. However, a function is not limited to just one basic block, and may include a plurality of basic blocks the executions of which have to be sequenced one after the other. Hereinafter, to simplify this description, it is considered that the program 28 includes two parameterized functions f and g. The function f includes two parameters, denoted pf1 and pf2, and the function g includes three parameters, denoted pg1, pg2 and pg3.

In the particular case described here, in order to execute the program 28 on the microprocessor 2, the memory 18 also includes:
 the code for a Bytecode interpreter 30,
 the code for a specialized code generator 32, and
 the code for a manager 34 of the execution flow of the program to be executed.

Each of these codes 30, 32 and 34 is preferably written in the machine language of the microprocessor 2 and is therefore able to be executed directly by this microprocessor. In this description, when it is said that a code, an instruction or a block of instructions is able to be executed directly by the microprocessor 2, this means that this code, this instruction or this block of instructions is written in the machine language of the microprocessor 2, and that it is therefore not necessary to compile it or to interpret it before being able to execute it.

The interpreter 30 is also known under the term "virtual machine" in the particular case of Bytecode Java. The interpreter contains a set of routines in machine language that are associated with each instruction contained in the Bytecode set of instructions. The interpretation consists in executing the routine in machine language, corresponding to each Bytecode instruction of the program.

The generator 32 generates a specialized binary code on the basis of the generic code for a function, and records it in the memory 22. In this embodiment, the generator 32 is a compiler on the fly, better known under the name "JIT (Just In Time) Compiler". In this case, it is used to generate, on the basis of the generic code for a function, a specialized code for this function by specializing one or more of the parameters of this function. The specialization of a parameter of a function consists in assigning a specific value to this parameter and then in optimizing and in compiling the generic code for this function, taking account of the known specific value of the specialized parameter, in order to obtain the specialized code. When it is executed by the microprocessor 2, the specialized code performs the same function as if the generic code were interpreted by the interpreter 30, but while executing fewer instructions. For example, if the parameter pf1 of the function f is specialized with the specific value "2", a specialized code is obtained, denoted Sf-2,pf2, which performs, when it is executed by the microprocessor 2, exactly the same function f(2,pf2) as that which would be performed by interpreting the generic code for the function f in the case where the value of the parameter pf1 is equal to "2".

Hereinafter, the following notation is used to denote a specialized code "Sb-a1, a2, . . . , an", where:
 "S" indicates that it is a specialized code.
 "b" is the identifier of the specialized generic code. In this example, b take either the value f in order to identify the function f or the value g in order to identify the function g.

"a1, a2, . . . , an" is the list of the parameters of the function, arranged in the order in which they appear as arguments of the function. If the parameter "ai" has been specialized, it is replaced with its specific value. If it has not been specialized, it is replaced with the name of its parameter.

For example, the notation Sg-2,3,pg3 denotes the specialized code for the function g, which code is obtained by specializing the parameters pg1 and pg2 with, respectively, the specific values 2 and 3 and in which the parameter pg3 has not been specialized.

The cost of executing the code Sf-2,pf2 is lower than the cost of interpreting the generic code for the function f(2, pf2). For example, the number of instructions of the code Sf-2,pf2 is smaller than the number of instructions executed by the microprocessor 2 when the generic code for this function f(2, pf2) is interpreted. Specifically, since the value of the parameter pf1 is known when the generic code is compiled, the generator 32 processes this parameter no longer as a variable, but as a constant, and this makes it possible to optimize the specialized code that is generated. To this end, the generator 32 implements at least one of the two following optimizations. The first optimization consists in including the value of the specialized parameter directly in the specialized code that is generated. The second optimization consists in deleting the specialized parameter of the specialized code.

The deletion of a specialized parameter is illustrated in the particular case where the generic code contains an operation: "If pf1≤3 Then perform action 1, Else perform action 2". If the specific value of the parameter pf1 is equal to 2, the generator 32 generates a specialized code including only the operation: "perform action 1". In this case, the instructions to test the value of the parameter pf1 are omitted, and the parameter pf1 no longer appears at this location in the specialized code that is generated.

Whether the parameter pf1 has been replaced with a constant or quite simply deleted from the specialized code, in any case, the specialized code no longer includes an instruction to read its value from a memory address situated outside of the continuous range of addresses where the specialized code is recorded. Because of this, the specialized code may contain fewer instructions than the generic code. In addition, the instructions to read the value of a parameter in memory are instructions that are costly in terms of execution time. Thus, for example, the specialized code that is generated enables the microprocessor 2 to execute the function f more quickly than if it had to interpret the generic code for this same function f to do this.

The role of the manager 34 is to manage the execution flows of the program 28. In particular, as will be described in more detail further on, the manager 34 groups together the following routines:
 a generator 35 of a routine 36 for looking up the address of a specialized code in a table 38,
 a statistical data collection routine 40, and
 a memory 20 management routine 42.

FIG. 2 is a schematic illustration of the table 38 and of its content in the form of a table of columns and rows. Those skilled in the art understand that this representation of the table 38 is a notional view that simplifies the explanations, and that there are a huge number of options for recording such a table in the memory 20. By contrast, regardless of the option chosen to record the table 38 in the memory 20, this makes it possible to reconstruct a representation of this table in the form of a chart as illustrated in FIG. 2. The table 38 thus corresponds to an area of the memory 20 in which the information shown in the form of a chart in FIG. 2 is recorded. First of all, the explanations regarding the operation of the central unit 1 are given using the representation of the table 38 in the form of a chart. Next, with reference to FIG. 5, an example of coding of the lookup routine 36 used in the table 38 is described.

In this case, the table 8 has seven columns and one row per specialized code recorded in the memory 20. The first column contains the identifier of the generic code for the specialized function. In this case, the identifiers of the functions f and g are denoted If and Ig, respectively. For example, the address where the generic code for the function has been recorded is used as an identifier of this generic code. This identifier is independent of the values of the parameters of this function. The second column contains the identifier of those parameters of the function that have been specialized. This embodiment is described in the particular case where the specialized parameters are explicit parameters of the function, that is to say the arguments of this function. What is described hereinafter in this particular case of the explicit parameters applies identically to the implicit parameters of the parameterized functions. In addition, it is assumed that the parameters are always specialized in the order in which they appear as an argument in the function. The first parameter pf1 is thus always specialized before the parameter pf2. Therefore, the generator 32 is able to generate the specialized codes Sf-0,pf2 and Sf-0,2. By contrast, the specialized code Sf-pf1,0, in which only the parameter pf2 is specialized, is not able to be generated, since the parameter pf1 appears, in the order of the arguments of the function f, before the parameter pf2. With these scenarios, the number of specialized parameters of the function suffices to identify the specialized parameters without ambiguity. In the present case, the number "1" is systematically added to the number of specialized parameters. By virtue of this, the number contained in the second column moreover identifies the end of the row.

The third column contains the address in the memory 22 where the specialized code is recorded. In this case, this address points to the first instruction, of the specialized code recorded in the memory 22. For the addresses, the same notation is used as for the specialized codes, except that the letter "S" is replaced with the symbol "@". In FIG. 2, the symbols "V0" to "V5" represent specific values.

The fourth, fifth, sixth and seventh columns are intended to contain the specific values of the specialized parameters. In the particular case shown here, only two parameters of the function f have been specialized, and only one parameter of the function g has been specialized. The sixth and seventh columns are thus empty. In addition, the cells in the fifth column that are associated with the specialized codes Sg-V5,pg2,pg3 and Sg-V0,pg2,pg3 are also empty, as the function g has been specialized only for the values V5 and V0 of its first parameter pg1. In FIG. 2, the wavy row indicates that only some of the content of the table 38 has been shown. Of course, the table 38 may contain additional columns if more than four parameters of a function are specialized.

The method for executing the program 28 will now be described with reference to FIG. 3. Initially, during a step 50, the microprocessor 2 starts by executing the interpreter 30. The interpretation consists in executing the routine in machine language, corresponding to each Bytecode instruction of the program, by scanning the Bytecode operations of the program 28 one after the other. Step 50 is thus reiterated for the following operation of the program 28. During these reiterations of step 50, the microprocessor 2 first of all obtains the values of each parameter of a parameterized function before calling said function with the values thus obtained. Calling the function takes place by way of a branch to the address where the generic code for this function is recorded. The address to which the execution of the program 28 is diverted is necessarily the address of the generic code for the function, given that the program 28 does not know and does not manage the execution of specialized code.

A branch is a jump that diverts the execution of the program to another instruction, than the instruction that immediately follows in the memory 18 or 22. For example, to this end, the value of the ordinal counter is changed so that the instruction pointer of the microprocessor 2 points to another instruction than the following instruction.

As soon as a branch to the address of a function has to be executed, during a step 52, the lookup routine 36 is executed. The execution of such a branch corresponds to calling a function with those values of the parameters that are obtained during the execution of step 50.

During step 52, the microprocessor 2 looks up, in the table 38, if there is a specialized code that is able to perform the called function when it is executed. To this end, the microprocessor 2 scans, in order, the rows of the table 38, starting from the first row and moving toward the last row. It thus performs the following operations:
a) it selects a row of the table 38, and then
b) it reads the identifier of the generic code contained in the first cell of this row, and then
c) it compares the identifier of the read generic code with the address of the called generic code,
d) if the identifier of the read generic code is not equal to the address of the called generic code, the microprocessor executes operations a) to c) anew, but for the following row of the table 38,
e) if the identifier of the generic code read during operation b) is equal to the address of the called generic code, the microprocessor 2 reads the identifier of the specialized parameters contained in the second cell of this row. In this case, this identifier of the specialized parameters is a positive integer, denoted n. Next, the microprocessor 2 executes the following pseudo-code:
For i ranging from 4 to n+2:
If T[L,i] is different from the value of the ith parameter obtained during the execution of step 50, Then exit the loop and execute operations a) to c) anew for the following row of the table 38.
End for.

In the above pseudo-code, T[L,i] is the content of the cell of the table 38 situated at the intersection of row number L selected during operation a) and of column i. In this case, the numbering of the columns of the table 38 starts with the number 1.

If the loop "For . . . End for" of the pseudo-code above is executed until the end, this means that the specific values of all of the specialized parameters are equal to the values of the parameters of the called function. There is therefore a specialized code capable of performing exactly the same function as the called generic code with the values of the parameters obtained during step 50.

In this case, during a step 54, the microprocessor 2 triggers the execution of the specialized code the address of which is contained in the third cell of the row selected during the last execution of operation a) of step 52.

It will be noted that, when step 54 is executed, it is not necessary to interpret or to compile the generic code for the function, this already constituting a substantial time saving.

In addition, as explained previously, the specialized code is also executed more quickly than the generic code because, for example, it does not need to go and read the values of all of the parameters of the function before processing them. The execution of the specialized code thus substantially speeds up the performance of the function by the microprocessor 2. At the end of the execution of the specialized code, the microprocessor returns to step 50 and resumes the interpretation of the program 28 in the following operation.

If, at the end of step 52, no specialized code has been found in the table 38, the microprocessor 2 executes a step 56 of collecting statistical data. To this end, the routine 40 is executed by the microprocessor 2. During this step 56, the microprocessor 2 collects and stores statistical data regarding the execution of the parameterized functions of the program 28. These statistical data are intended to be used to decide whether or not a specialized code has to be generated.

Step 56 will now be described in more detail in the particular case of the parameterized function f. However, the explanations given in this particular case are able to be transposed without difficulty for those skilled in the art to any other parameterized function of the program 28, such as the function g.

Each time step 56 is executed for the function f with the specific values Vx and Vy for the parameters pf1 and pf2, respectively, of this function, the microprocessor 2 updates the value of a counter Cf-Vx,pf2 and a counter Cf-Vx,Vy. In this case, the update consists in incrementing the values of these counters by a predetermined step. The values Vx and Vy of the parameters pf1 and pf2 are those that are obtained during the previous iteration of step 50. The notation used here to denote the counters is the same as, that used to denote the specialized codes, except that the letter "S" is replaced with the letter "C". The predetermined step is equal to one, for example.

There is thus a counter Cf-Vx,pf2 associated with each different value Vx obtained during the execution of the program 28, and for which a specialized code for the function f does not already exist. There are also as many counters Cf-Vx,Vy as there are different pairs of values Vx,Vy obtained during the execution of the program 28, and for which, a specialized code for the function f does not already exist.

It is also recalled in this case that it is assumed that, in this embodiment, the parameters are only specialized in the order in which they appear as an argument of the function f. It is thus made impossible to specialize the parameter pf2 without specializing the parameter pf1. Therefore, it is not necessary to collect statistical data regarding the values of the parameter pf2 independently of the values of the parameter pf1. The counters Cf-pf1,Vy are therefore not used in this embodiment.

The counters Cf-Vx,pf2 and Cf-Vx,Vy are created and initialized at zero when step 56 is executed for the first time with the values Vx and Vy of the parameters pf1 and pf2.

Once step 56 has ended, the microprocessor 2 proceeds to a step 58 in which it uses the generic code for the function to perform this function, and not a pre-existing specialized code recorded in the memory 22. In this embodiment, there are two alternatives for performing step 58. The first alternative consists in generating, on the basis of the generic code for the function, a specialized code that has not been found in the table 38 during step 52, and then in storing its address in the table 38 and in executing this specialized code. The second alternative consists in interpreting the generic code for the function using the interpreter 30. The first alternative may prove more costly than the second alternative. Hereinafter, in this embodiment, the cost corresponds to the execution time. For example, the time necessary to perform the function in the first alternative may prove longer than the time necessary to perform the same function, but implementing the second alternative. Specifically, in the case of the first alternative, it is necessary to add, to the time to execute the specialized code, the time necessary to generate this specialized code. However, even if the time to execute the first alternative is longer than that for the second alternative, it may be beneficial still to implement this first alternative if the specialized code that is generated is able to be reused several times during subsequent executions of this same function. Specifically, during subsequent executions of the specialized code, the time taken to generate this specialized code no longer needs to be taken into account, since it is present in the memory 22. This therefore generally results in a time saving in comparison with interpreting the generic code for the function. In this case, to choose between the first and the second alternatives, the manager 34 is executed so as to minimize as much as possible the chosen cost, that is to say in this case the time to execute the program 28.

More precisely, in this embodiment, the first alternative is executed as soon as a predetermined condition is met. The condition in this case is the crossing of a pre-calculated threshold by the value of a counter.

For example, each incremented counter is compared to a pre-calculated threshold that is associated therewith. Hereinafter, the same notation is used for the pre-calculated thresholds as that defined for the specialized codes, except that the letter "S" is replaced with the letter "N". The thresholds associated with the counters Cf-Vx,pf2 and Cf-Vx,Vy are thus denoted Nf-Vx,pf2 and Nf-Vx,Vy, respectively.

In this case, this comparison is performed by starting firstly with the counters associated with the greatest number of specialized parameters, and moving toward the counters associated with the smallest number of specialized parameters. The microprocessor 2 thus systematically compares firstly the value of the counter Cf-Vx,Vy with the threshold Nf-Vx,Vy, and then the value of the counter Cf-Vx,pf2 with the threshold Nf-Vx,pf2. By virtue of this, as described further on, this makes it possible to arrange the rows of the table 38 in an order that prevents the occurrence of conflicts.

As soon as the value of a counter exceeds the threshold that is associated therewith, the microprocessor 2 implements the first alternative during an operation 60 of generating a specialized code and then executing this specialized code. In the opposite case, that is to say if none of the incremented counters have exceeded the threshold that is associated therewith, the microprocessor 2 implements, during an operation 62, the second alternative.

Thus, during the operation 60, the generator 32 is executed so as to generate a specialized code with the specific values of the parameters associated with the counter that crossed the threshold associated therewith.

For example, if the value of the counter Cf-Vx,Vy exceeds the threshold Nf-Vx,Vy, then the generator 32 generates the code Sf-Vx,Vy for the function f with the specific values Vx and Vy for the parameters pf1 and pf2, respectively. Next, only the counter Cf-Vx,Vy is deleted. Therefore, since the counter Cf-Vx,pf2 remains, later on in the execution of the program 28, this counter Cf-Vx,pf2 may exceed the threshold Nf-Vx,pf2. If this is the case, then the generator 32 generates the specialized code Sf-Vx,pf2. By contrast, when the generator 32 generates the code Sf-Vx,pf2, it deletes, at the same time, the counters Cf-Vx,pf2 and all of the counters Cf-Vx,Y, where Y is an arbitrary specific value. Specifically, as soon as the generator 32 generates the specialized code Sf-Vx,pf2, it thereafter no longer has to generate a specialized code Sf-Vx,Y. This is due to the fact that, during step 52, the rows of the table 38 are scanned in order, starting from the first row toward the last row. If the code Sf-Vx,pf2 is generated before the code Sf-Vx,Vy, the address @f-Vx, pf2 is located systematically on a row situated before the row that could contain the address @f-Vx,Vy. Therefore, when the function f is called with the values Vx and Vy, it is the address @f-Vx,pf2 that is systematically found first, and therefore the specialized code Sf-Vx,pf2 that is systematically executed. Thus, even if the code Sf-Vx,Vy had been generated after the code Sf-Vx,pf2, in this embodiment, it would practically never be executed.

In addition this way of operating makes it possible to easily solve the conflict that could arise if:
the microprocessor 2 generated the specialized codes Sf-Vx,pf2 and Sf-Vx,Vy at the same time, and
during step 52 the microprocessor 2 systematically scanned all of be rows of the table 38.

In this case, when the function f is called with the values Vx and Vy of the parameters pf1 and pf2, the microprocessor 2 would identify, in the table 38, two specialized codes Sf-Vx,pf2 and Sf-Vx,Vy capable of being executed in order to perform the function f. It would therefore additionally be necessary to implement a rule enabling the microprocessor 2 to automatically choose which of these two specialized codes has to be executed.

After having generated the specialized code, the microprocessor 2 records it in the memory 22. To this end, the microprocessor 2 executes the routine 42 that performs the following operations:

g) The routine 42 examines whether there is a free space in the memory 22 of sufficient size to contain the specialized code that is generated.

h) If, so, the microprocessor 2 then records the specialized code that is generated in a continuous range of addresses within this free space.

i) Next, the microprocessor 2 updates the table 38. More precisely, the microprocessor 2 adds a new row containing the identifier of the genetic code, the identifier of the specialized parameters for generating this specialized code, the address where the continuous range of addresses where this specialized code is recorded in the memory 22 starts, and the specific values of the specialized parameters. This new row is added, just after the last row of the table 38.

j) If there is no free space that is large enough to contain the specialized code that is generated in the memory 22, the microprocessor 2 starts by deleting the oldest specialized code, that is to say the one recorded in the range of addresses that starts at the address contained in the first row of the table 38. This first row of the table 38 is also deleted, such that it is the second row of this table 38 that now becomes the first row. Next, it executes operations g) to j) anew.

This manner of managing the memory 22 makes it possible to minimize the size thereof. In addition, in this embodiment, each time the table 38 is modified, the microprocessor executes the generator 35 so as to generate a new routine 36, written in the machine language of the microprocessor 2, and records it in the place of the previous routine 36. This operation is described in more detail with reference to FIG. 5.

At the end of the operation 60, the microprocessor 2 executes the specialized code that is generated in order to perform the desired function.

During the operation 62, the microprocessor 2 executes the interpreter 30 in order to interpret the generic code for the function. In this case, the values of all of the parameters are processed as variables, and these values therefore have to be read in memory outside of the range of addresses where the generic code is recorded before being processed by the interpreter 30.

Once the operation 60 or 62 has been executed, step 58 is ended and the microprocessor returns to step 50 in order to execute the following operation of the program 28.

In parallel with the steps described previously, during a phase 70, the microprocessor 2 calculates and dynamically updates each threshold associated with a counter. More precisely, the microprocessor calculates, during a step 72, each threshold on the basis of a relationship Kgen/[Klib−Kdyn]. In this embodiment, each cost Kgen, Klib and Kdyn is obtained only on the basis of data relating to the same parameterized function and the same specific values as those associated with the counter for which this threshold is calculated. Therefore, the costs Kgen, Klib and Kdyn are specific to each counter. In this embodiment, to elucidate this specificity, the costs Kgen, Klib and Kdyn are followed, between parentheses, by an identifier of the counter with which they are associated.

The calculation of a threshold is now described in the particular case of the threshold Nf-Vx,Vy associated with the counter Cf-Vx,Vy. Those skilled in the art know how to adapt this teaching to the calculation of the thresholds of all of the other counters described previously. In this case, the threshold Nf-Vx,Vy is calculated using the following formula: Nf-Vx,Vy Kgen(f-Vx,Vy)/[Klib(f-Vx,Vy)−Kdyn(f-Vx,Vy)], where:

Kgen(f-Vx,Vy) is the cost of generating the specialized code Sf-Vx,Vy.

Klib(f-Vx,Vy) is the cost of performing the function f without using the specialized code, and Kdyn(f-Vx,Vy)] is the cost of performing the function f by executing the specialized code Sf-Vx,Vy.

In this case, the cost is the execution time. Thus, the cost Kgen(f-Vx,Vy) is equal to the time necessary for the microprocessor 2 to generate the specialized code Sf-Vx,Vy. The cost Klib(f-Vx,Vy) is equal to the time taken by the microprocessor 2 to interpret the generic code for the function f with the values Vx and Vy for the parameters pf1 and pf2. The cost Kdyn(f-Vx,Vy) is the time taken by the microprocessor 2 to execute the specialized code Sf-Vx,Vy during step 54.

Step 72 is executed a first time before the first use, during step 58, of the threshold Nf-Vx,Vy. During this first execution of step 72, the costs Kgen(f-Vx,Vy), Klib(f-Vx,Vy) and Kdyn(f-Vx,Vy) are initialized on the basis of values that are recorded beforehand in the memory 20.

Next, during a step 74, the microprocessor 2 measures and updates the costs. For example, each time the specialized code Sf-Vx,Vy is generated, the microprocessor 2 acquires a measurement of the time taken to generate this specialized code and records it in the memory 20 in the place of the previous value of the cost Kgen(f-Vx,Vy). In this case, for example, the microprocessor 2 measures the time taken to execute a task by triggering a timer just before starting the execution of this task. Next, it records the value of this timer just after the end of the execution of this task. The recorded value is considered to be the time taken to execute this task.

In the same way, each time the operation 62 is executed for the function f with the values Vx, Vy of the parameters pf1 and pf2, the time taken to perform the operation 62 is measured and then recorded in the memory 20 in the place of the previous value of the cost Klib(f-Vx,Vy).

Finally, each time the specialized code Sf-Vx,Vy is executed during step 54 or step 60, the time taken to execute this step is measured and then recorded in the memory 20 in the place of the previous value of the cost Kdyn(f-Vx,Vy). After each update of one of the costs Kgen(f-Vx,Vy), Klib(f-Vx,Vy) and Kdyn(f-Vx,Vy), step 72 is executed anew. It is recalled in this case that, during one and the same execution of the program 28, the specialized code Sf-Vx,Vy may be generated several times because, as described previously, the specialized code is able to be deleted from time to time from the memory 22 in order to free up space for other specialized codes.

It is noted that the formula above gives a value for the threshold Nf-Vx,Vy that is strictly smaller than one if the sum of the time to generate the specialized code Sf-Vx,Vy and the time to execute this specialized code is strictly less than the time to interpret the generic code for the function f with the values Vy of the parameters pf1 and pf2. In this case, the specialized code Sf-Vx,Vy is generated starting from the first call of the function f with the values Vx, Vy.

In the other cases, the value of the threshold Nf-Vx,Vy will be all the greater for the fact that it becomes difficult to amortize the generation of the specialized code Sf-Vx,Vy. Typically, amortizing the generation of a specialized code is difficult if the gap between the cost of executing the operation 62 and step 54 for the same function with the same parameter values is small, or if the cost Kgen of generating the specialized code is large. If the time to execute the specialized code Sf-Vx,Vy is longer than the time to interpret the generic code with the values Vx, Vy of the parameters, then the value of the threshold Nf-Vx,Vy is negative. In this case, the microprocessor 2 systematically prevents the generation of the specialized code Sf-Vx,Vy.

What has been described above for the calculation of the threshold Nf-Vx,Vy is applied identically for all of the other thresholds by replacing, in the explanations above, the symbol "f-Vx,Vy" with the identifier of the function and specific values of the specialized parameters associated with this counter. Thus, the value of the threshold Nf-Vx,pf2 is calculated and updated as described above, but by using the following formula: Nf-Vx,pf2=Kgen(f-Vx,pf2)/[Klib(f-Vx,pf2)−Kdyn(f-Vx,pf2)] where Kgen(f-Vx,pf2), Klib(f-Vx,pf2) and Kdyn(f-Vx,pf2) are, the same as the costs Kgen(f-Vx,Vy), Klib(f-Vx,Vy) and Kdyn(f-Vx,Vy), respectively, but for the function f with the value Vx for the parameter pf1 and an arbitrary value for the parameter pf2.

Figures 3, 4, 5:
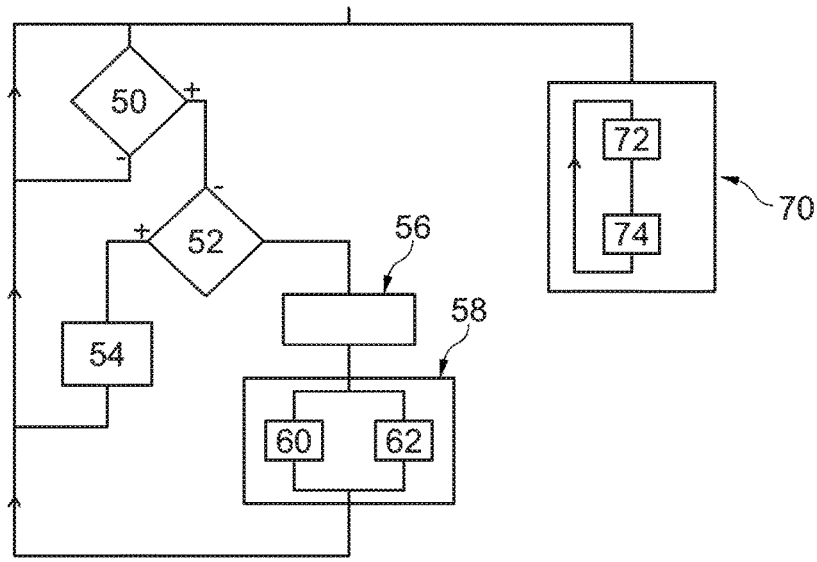
FIG. 3 is a flow chart of a method for executing a computer program using the central unit of FIG. 1.
FIG. 4 is a partial pseudo-code for a computer program that is capable of being executed using the method of FIG. 3.
FIG. 5 is a partial pseudo-code for a lookup routine that is implemented in the method of FIG. 3.

The operation of the method of FIG. 3 is now illustrated in the particular case of the pseudo-code shown in FIG. 4. In this figure and in FIG. 5, the numbers on the left are the row numbers. It is assumed that the thresholds Nf-2,pf2; Nf-5, pf2; Nf-2,10; Nf-2,12; Nf-5,20 and Nf-5,14 are all equal to two. When the function f is called for the first time, at row 3, the counters Cf-2,pf2 and Cf-2,10 are created and then incremented by one. At this stage, their value is therefore equal to one. The function f(2, 10) is performed by interpreting the generic code for this function.

When the function f is called for the second time, at row 4, the counters Cf-5,pf2 and Cf-5,10 are created and then incremented by one. They are therefore now both equal to one. Next, the function f(5, 10) is performed by interpreting the generic code for this function.

Upon the first iteration of the loop between rows 5 and 8, the counters Cf-2,pf2 and Cf-2,12 are incremented by 1, and the function f(2, 12) is performed by interpreting the generic code for the function f.

Upon the second iteration of the loop between rows 5 and 8, the counter Cf-2,pf2 is incremented and exceeds the threshold Nf-2,pf2. The specialized code Sf-2,pf2 is therefore generated, and the counters Cf-2,10, Cf-2,12 and Cf-2,pf2 are deleted. The table 38 is updated in order to add the row that contains the address @f-2,pf2 where the specialized code Sf-2,pf2 is recorded in the memory 22. Finally, the function f(2, 12) is performed by executing the specialized code Sf-2,pf2.

From the third until the fifteenth iteration of the loop between rows 5 and 8, it is the specialized code Sf-2,pf2 that is executed in order to perform the function f(2,12).

Upon the first iteration of the loop between rows 9 and 12, the counter Cf-5,pf2 is incremented, and the counter Cf-5,14 is created and incremented as well. At this stage, the value of the counter Cf-5,pf2 is equal to two and the value of the counter Cf-5,14 is equal to one.

Upon the second iteration of the loop between rows 9 and 12, the counter Cf-5,pf2 exceeds the threshold Nf-5,pf2. The specialized code Sf-5,pf2 is therefore generated, and the counters Cf-5, Cf-5,20 and Cf-5,14 are deleted. The table 38 is updated in order to add the row that contains the address @f-5,pf2. Finally, the function f(5,14) is performed by executing the specialized code Sf-5,pf2. From the third until the fifteenth iteration of the loop between rows 9 and 12, it is the specialized code Sf-5,pf2 that is executed in order to perform the function f(5,14).

FIG. 5 shows a portion of the code for the lookup routine 36, which code is generated during the operation 60 of the method of FIG. 3. The routine 36 is generated on the basis of the updated content of the table 38. In FIG. 5, the lookup routine 36 is called "Lookup-spec". In rows 6 and 11, the symbol " . . . " simply indicates that a portion of the code for the routine 36 has not been shown. These portions that are not shown are derived without difficulty from the following explanations.

The routine 36 has two features that speed up its execution by the microprocessor 2. Firstly, the content of the table 38 is encoded as a constant within the code for this routine 36. Thus, when the routine 36 is executed, it is not necessary to go and read the content of the table 38 from addresses situated outside of the continuous range of addresses where the code for this routine 36 is recorded. Secondly, rather than returning the address of the specialized code that is looked up or, if no specialized code has been found, a default value, the routine 36 includes branches that directly trigger the execution of the specialized code that is found and, if not, of the generic code. In FIG. 5, these branches are represented by the instruction "branch" followed either by the address of a specialized code or by the address @f, which triggers the performance of the function f using the generic code. Having to store the address of the specialized code that is found in a variable is thus avoided, thereby speeding up the execution of the program 28.

In the pseudo-code shown in FIG. 5, the symbol "Id" denotes the identifier of the generic code for the called function. The symbol "Value" denotes a variable that contains those values of the various parameters of the called function that are obtained during step 50. The instruction "Compare (If, elem0)" compares the identifier of the function If with the identifier Id and the values of the specialized parameters contained in the constant elem0 with the corresponding values contained in the variable Value. In the case where there is a difference between If, elem0 and Id, Value, the instruction "Compare" is continued by executing the instruction that is located two rows below. In the opposite case, that is to say if the elements If and elem0 are equal to the identifier Id and the element Value, respectively, then the instruction situated in the row immediately below is executed. In the case described here, this is the instruction "branch @If-elem0", which directly redirects the execution of the program 28 to the address @If-elem0. For example, to this end, the address @If-elem0 is situated in the ordinal counter associated with the arithmetic and logic unit 4. The instructions "Compare" and "branch", situated in the following rows, operate as described previously, except that they do not compare the values Id and Value with the same elements of the table 38 and do not redirect the execution of the program 28 to the same specialized code address.

If the called function is the function f, but it is called with values obtained for the parameters that do not correspond with any of those recorded in the table 38, the instruction "branch @f" is executed. The execution of this instruction redirects the execution of the program 28 to an address that triggers the interpretation of the generic code for the function f. Given that the content of the table 38 is encoded as a constant in the code for the routine 36, each time the table 38 is modified, the routine 36 has to be generated anew. However, given that, in almost all cases, the number of times that the routine 36 is called is far higher than the number of times that the table 38 is modified, the time lost in generating the routine 36 described above is compensated for by the saving in time brought about by the fact that it executes more quickly than if it had not been specialized according to the content of the table 38.

Numerous other embodiments of the execution method described above are possible. For example, the microprocessor 2 is programmed to identify the implicit parameters and note their values before or during the execution of the operation 62. Next, the implicit parameters thus noted are processed as described for the explicit parameters. In particular, steps 56 and 74 are also executed for these implicit parameters. In addition, the generator 32 is then adapted to process an implicit parameter of a function as a constant, and thus generate a specialized code that is optimized by taking account of the specific value of this implicit parameter.

As a variant, the interpreter 30 may be omitted if the program 28 to be executed is written directly in the machine language of the microprocessor 2 and not in Bytecode. In this variant, the program 28 is therefore no longer a code that is independent of the structural specificities of the central unit 1. In this case, the generic code for the functions f and g is also written in machine language and not in Bytecode. However, these generic codes, unlike the specialized codes, contain, for each parameter, instructions to read the value of this parameter outside of the continuous range of addresses where the generic code for this function is recorded. In this case, the generator 32 retains its function of optimizing the generic code according to the specific value assigned to the parameter to be specialized. Thus, everything that has been described previously for the generator 32 in the particular case of a generic code written in Bytecode remains unchanged, except that the generator 32 compiles the generic code written in machine language into a specialized code written in the same machine language. In this case, the generator 32 is known under the term "dynamic optimizer".

In another variant, the program 28 is written in a machine language of another microprocessor that is different from the microprocessor 2. In this case, the generator 32 does not have to compile the program 28, but has to translate the instructions of the program 28 into the machine language of the microprocessor 2. The generator 32 is then known under the acronym DBT (dynamic binary translator). As previously, this variant affects only the compiler function of the generator 32, but in no way modifies the optimization functions that it has to perform in order to generate the specialized code.

What has been described previously is able to be implemented with any type of programming language. For example, this may be implemented with the language deGoal. In particular, during the operation 62, the generic code is not necessarily interpreted. For example, as a variant, the generic code is a program that is obtained conventionally by a static compiler and is located in the program memory 18 before the program is launched.

The specialized code does not need to be systematically generated on the fly when the program 28 is executed. As a variant, when the program 28 is written, the programmer may identify functions to be specialized in this program and then generate, even before the execution of this program starts, the corresponding specialized codes using the generator 32, for example. Next, when the program 28 is installed in the central unit 1, the specialized codes generated in advance are recorded in the memory 18 at the same time as the program 28. At the start of the execution of the program 28, the manager 34 updates the table 38 so as to include therein the address of the specialized codes that are recorded beforehand in the memory 18. Thus, as soon as the function is called with a specific value, corresponding to that used to generate one of the specialized codes for this function, the generator 34 directly triggers the execution of the specialized code recorded beforehand, without it being necessary to call the generator 32, at least upon the first execution.

The memory 22 is not necessarily a volatile memory. As a variant, it is replaced with a non-volatile memory, such as a memory known under the acronym NVRAM (Non-Volatile Random Access Memory).

The identifier of a function in the table 38 may also be the name of this function. In another variant, the identifier of the function is obtained by applying a hash function to the generic code for this function. By contrast, this identifier remains the same regardless of the values obtained for the parameters of this function.

If the manager 34 is programmed to trigger the specialization of just one function of the program 28, the identifier of the generic code in the table 38 may be omitted and the first column deleted. For example, the manager is programmed to authorize only the specialization of the function f.

If the manager 34 still specializes the n first parameters of the parameterized functions, where n is a constant integer greater than or equal to one, then the second column containing the identifier of the specialized parameters of the function may be omitted. This embodiment also simplifies the routine 40, since there are then fewer counters to manage.

In another variant, the manager 34 is able to specialize any parameter of a function, and not necessarily in the order of the arguments of this function. Thus, for example, the generator 32 may generate the specialized codes Sf-0,pf2 and Sf-pf1,0 at the same time. The identifier of the specialized parameters that are described with reference to FIG. 2 does not make it possible to distinguish between these two specialized codes. Thus, in this case, for example, the identifier of the specialized parameters is replaced with another identifier of specialized parameters including a mask of 3 bits or more. In this mask, the position of the bit identifies the parameter of the function, and the value "1" of the bit indicates that this parameter has been specialized, whereas the value "0" of this bit indicates, by contrast, that this parameter has not been specialized. Thus, the identifier of the specialized parameters of the codes Sf-0,pf2 and Sf-pf1,0 are [1;0] and [0;1], respectively. In this case, the routine 40 also has to be modified in order to collect the statistical data regarding the values of each of these parameters. For example, in the case of the function f, during step 56, an additional, counter Cf-pf1,Vy is used. This counter Cf-pf1,Vy is associated only with the function f and also associated only with the value Vy of the parameter pf2. It is incremented each time the parameter pf2 takes the value Vy. If the value of this counter Cf-pf1,Vy exceeds a threshold Nf-pf1,Vy, then a specialized code Sf-pf1,Vy is generated by specializing only the parameter pf2 with the value Vy.

Another solution consists in introducing one column per parameter into the table 38, and in recording the value of the parameter used to generate the specialized code for a function in the only column that is associated therewith. In this case, the absence of a value in one of these columns indicates that the parameter associated with this column has not been specialized.

Other embodiments of the lookup routine 36 are possible. For example, in the case where a specialized code is found, the routine 36 returns the address of this specialized code, rather than redirecting the execution of the program directly to this specialized code. Next, the address returned by the routine 36 is used to execute a branch to this address. If no corresponding specialized code is found in the table 38, the routine 36 returns a default value that indicates the absence of a specialized code in the table 38 corresponding to the function that is looked up. It will however be noted that this variant assumes that an additional variable is used to store the address, or the default value, that is returned by the routine 36. This variant operates correctly, but is therefore executed less quickly than the main embodiment described previously.

In another embodiment, the routine 36 is not specialized according to the content of the table 38. The generator 35 may thus be omitted. Specifically, in this case, it is not necessary to generate a new routine 36 in machine language each time the content of the table 38 is modified.

As a variant, the routine 36 is modified so as to systematically run through all of the rows of the table 38 and select one or more rows containing addresses of specialized codes that are capable of performing the called function when they are executed. In this case, the routine 36 also implements a rule for automatically choosing the specialized code to be executed from among the various specialized codes selected. For example, the routine 36 is programmed to systematically select the address of the specific code that contains the greatest number of specialized parameters. In this variant, even if the specific code Sf-Vx,pf2 has been generated first, the counters Cf-Vx,Vy are not deleted during step 56, and step 56 is systematically executed after step 52 in order to continue to update these counters. Thus, even if the specialized code Sf-Vx,pf2 is generated first, it remains possible subsequently to generate other specialized codes for the same function f, such as the code Sf-Vx,Vy for example.

The lookup routine 36 is also able to be generated, in machine language, by another microprocessor and then, for example, be recorded in the memory 22 before the start of the execution of the program 28.

Other execution costs may be taken into account in order to decide to trigger the generation of a specialized code. For example, the cost taken into account may be the quantity of one of the following physical variables, or of a combination of these physical variables: electrical consumption, the electric power consumed, the execution time, the temperature, or the level of electric or acoustic noise. One combination of these physical variables that is often used is known under the acronym EDP ("energy-delay product"). The EDP is equal to the product of the execution time and the power consumed.

Preferably, regardless of the physical variable chosen, the microprocessor is equipped with a sensor that makes it possible to measure the quantity of this physical variable in real time. It is then these quantities measured by these sensors that are used to update the costs Kgen, Klib and Kdyn.

Phase 70 is able to be implemented independently of the method described to select the specialized code to be executed and, in particular, of the structure of the table 38. For example, phase 70 is advantageously able to be implanted into a method such as the one described in application US 2010/0095284.

Numerous other methods for measuring the time to generate the specialized code and to execute this specialized code are possible. For example, all of the methods described in chapter 3.1 of the following article are able to be used:

M. Arnold et al., "Adaptive optimization in the jalapeño JVM", ACM SIGPLAN Notices, vol. 46, no 4, pp 65-83, 2011.

Another possible method is described in the following article:

D. Buytaert et al., "Using HPM-Sampling to drive dynamic compilation", Proceeding of the conference on object-oriented programming systems, languages and applications, OOPSLA, pp 553-567, 2007.

Finally, another method for measuring the time to generate the specialized code and to perform the function on the basis of the generic code may be found in the following article:

S-W. Lee et al., "Enhanced hot spot detection heuristics for embedded java just-in-time compilers", Proceedings of the ACM SIGPLAN Conference on languages, compilers and tools for embedded systems (LCTES), pp 13-22, 2008.

The thresholds described previously are also able to be calculated differently. For example, the threshold Nf-Vx,Vy is calculated using the following formula: Nf-Vx,Vy= v(Kgen(f-Vx,Vy)/[Klib(f-Vx,Vy-Kdyn(fVx,Vy)], where v( . . . ) is a continuously increasing function, such as for example an exponential or logarithmic function, or a simple product of a numerical constant.

In another embodiment, all of the counters associated with one and the same function f are also associated with the same threshold, denoted Nf. Thus, regardless of the value of the specialized parameters of the function f, the threshold Nf that is used is the same. By contrast, the counters associated with the various functions do not generally have the same thresholds. Thus, generally, the threshold Nf is different from the threshold Ng associated with the function g. In this embodiment, the threshold is therefore common to all of the counters that are associated with the same function, but independent of the specific values of the parameters of this function.

The threshold Nf is preferably calculated using the formula Nf=Kgen(f)/Klib(f)−Kdyn(f)], where Kgen(f), Klib(f) and Kdyn(f) are the same costs as the costs Kgen(f-Vx,Vy), Klib(f-Vx,Vy) and Kdyn(f-Vx,Vy), respectively, but calculated independently of the values of the parameters pf1 and pf2. For example, Kgen(f), Klib(f) and Kdyn(f) are measured each time that, respectively:

a specialized code for the function f is generated,
the generic code for the function f is used to perform this function,
a specialized code for the function f is executed.

The threshold calculated during step 72 is thus common to all of the counters associated with the same function, such that, when step 58 is executed, regardless of the counter that is used during this step 58, it is the same threshold pre-calculated during step 72 that is used.

In another embodiment, the costs are not updated dynamically or measured. In this case, step 72 is executed just once by the microprocessor 2 in order to initialize the values of the various thresholds that are used.

Phase 70 may also be omitted. For example, the various thresholds associated with the various counters are constants that are recorded beforehand in advance in the memory 20.

In another embodiment, each time a parameterized function is called, a corresponding specialized code is generated and then executed. In this embodiment, the decision to generate a specialized code is taken systematically. The method of FIG. 3 is then able to be simplified; in particular, phase 70 and the operation 62 are omitted, and the operation 60 is simplified. The statistical data collection routine 40 is able to be omitted in this case.

Methods other than those described previously are able to be used to decide whether or not it is necessary to trigger the generation of a specialized code. For example, as a variant, the methods described in the following articles are able to be used:

E. Duesterwald et al., "Software profiling for hot path prediction: Less is more", International Conference on Architectural Support for Programming Languages and Operating Systems, ASPLOS, pp 202-211, 2000, D. Buytaert et, al., "Using HPM-sampling to drive dynamic compilation", Proceeding of the conference on Object-Oriented Programming Systems, Languages and Applications, OOPSLA, pp 553-567, 2007, M. Arnold et al., "Adaptive optimisation in the jalapeño JVM", ACM SIGPLAN Notices, vol. 46, no 4, pp 65-83, 2011.

The invention claimed is:

1. A method for executing a computer program including at least one parameterized function capable of being executed one or more times during execution of the program, the function including at least one parameter a value of which is obtained at an instant when the function is called to be executed by a microprocessor or during execution thereof by the microprocessor, the method comprising:

a) providing a generic code for the function, in which code each parameter of the function is encoded as a variable such that the generic code does not itself contain the value of the parameter, but contains an operation of reading its value from an address specified by the generic code;

b) verifying a condition, the condition being crossing of a first pre-calculated threshold by a value of a first counter;

c) only if the condition is verified, generating, by the microprocessor, a specialized code for the function, in the machine language of the microprocessor, and then recording the specialized code in a memory, the specialized code performing, when it is executed by the microprocessor, same function as the generic code but, in a case that at least one parameter of the function is specialized with a first specific value, the specialization of the at least one parameter of the function with the first specific value, assigning the first specific value to the at least one parameter and then processing the parameter no longer as a variable but as a constant, such that the specialized code does not include any operation of reading its value from an address situated outside of a continuous range of addresses where the specialized code is recorded;

d) next, when the function is performed with the first specific value of the parameter, if the specialized code is recorded in the memory, the microprocessor performs the function by directly executing the specialized code recorded in the memory without using the generic code for the function; and e) if the specialized code is not recorded in the memory, the microprocessor performs the function using its generic code, wherein:

when the program is executed, each time the function is performed with the first specific value of the parameter, the microprocessor updates a value of the first counter and, alternately, does not update the value of the first counter if the same function is performed with another value, different from the first specific value, of the parameter;

the microprocessor also executes a) to e) by replacing the first specific value, the first counter, and the first pre-calculated threshold with a second specific value, a second counter, and a second pre-calculated threshold, respectively, the second specific value being different from the first specific value, such that the specialized code that is generated in this case is obtained by specializing the parameter of the function with the second specific value instead of the first specific value; and the method further comprises f) calculating the first and second pre-calculated thresholds each on the basis of a relationship Kgen/(Klib−Kdyn), wherein:

Kgen is a pre-recorded cost to execute c),

Kdyn is a pre-recorded cost to execute d),

Klib is a pre-recorded cost to execute e), and the costs Kgen, Kdyn and Klib are each respective quantities of a same physical variable with different values or of a combination of different physical variables with different values that varies depending on whether the microprocessor executes d) or e);

when the first pre-calculated threshold is calculated, the costs Kgen, Kdyn, and Klib being costs to execute c), d), and e), respectively, these operations are executed only in a case where the first specific value is used; and when the second pre-calculated threshold is calculated, the costs Kgen, Kdyn, and Klib being costs to execute c), d), and e), respectively, these operations are executed only in a case where the second specific value is used.

2. The method as claimed in claim 1, wherein each physical variable is chosen from the group consisting of execution time, electrical energy consumed, electric power consumed, temperature of the microprocessor, and intensity of noise generated by the microprocessor.

3. The method as claimed in claim 1, wherein, during b), if the first counter is used, the first threshold is used and, alternately, if the second counter is used, then the second threshold is used in place of the first threshold.

4. The method as claimed in claim 1, wherein:

a) to e) are executed for at least one first function and one second function, respectively, the generic codes for which are different;

the execution of f) for the first function calculates a first threshold on the basis of the costs Kgen, Kdyn and Klib that are obtained by taking account only of the executions of c), d) and e) for the first function, only the first threshold being used during the subsequent execution of b) for the first function;

the execution of f) for the second function calculates a second threshold on the basis of the costs Kgen, Kdyn and Klib that are obtained by taking account only of the executions of c), d) and e) for the second function, only the second threshold being used during the subsequent execution of b) for the second function.

5. The method as claimed in claim 1, wherein, when d) and e) are executed, the method includes measuring the quantity of the same physical variable or the combination of different physical variables, and then the microprocessor calculates each threshold that is used during b) on the basis of the measurements of the costs Kdyn and Klib.

6. The method as claimed in claim 5, wherein, when c) is executed, the method further comprises measuring the quantity of the same physical variable or the combination of different physical variables, and then the microprocessor calculates each threshold that is used during b) on the basis of the measurement of the cost Kgen.

7. The method as claimed in claim 5, wherein the same physical variable is the execution time and the microprocessor measures the execution time of each c), d) and e) by triggering, at start of the execution, a timer that counts the time that has elapsed since triggering thereof, and by noting the elapsed time counted by the timer at the end of the execution, the noted elapsed time forming the measurement of the execution time.

8. The method as claimed in claim 1, wherein, each time the function is performed with a specific value of the parameter, the microprocessor increments a counter associated with the function and with the specific value of the parameter, if the counter already exists, and if the counter does not exist, creates the counter and then increments the counter.

9. A non-transitory computer readable medium, including instructions for executing a method as claimed in claim 1 when the instructions are executed by a microprocessor.

10. An electronic central unit for executing a computer program including a parameterized function capable of being executed one or more times during execution of the program, the function including at least one parameter a value of which is obtained at an instant when the function is called to be executed by a microprocessor or during execution thereof by the microprocessor, the electronic central unit comprising:

a memory or a set of memories containing a generic code for the function, in which code each parameter of the function is encoded as a variable such that the generic code does not itself contain a value of the parameter, but contains an operation of reading its value from an address specified by the generic code;

the microprocessor programmed to perform:

b) verifying a condition, the condition being crossing of a first pre-calculated threshold by a value of a first counter;

c) only if the condition is verified, generating, by the microprocessor, a specialized code for the function, in the machine language of the microprocessor, and then recording the specialized code in a memory, the specialized code performing, when it is executed by the microprocessor, same function as the generic code but, in a case that at least one parameter of the function is specialized with a first specific value, the specialization of the at least one parameter of the function with the first specific value, assigning the first specific value to the at least one parameter and then processing the parameter no longer as a variable but as a constant, such that the specialized code does not include any operation of reading its value from an address situated outside of a continuous range of addresses where the specialized code is recorded;

d) next, when the function is performed with the first specific value of the parameter, if the specialized code is recorded in the memory, the microprocessor performs the function by directly executing the specialized code recorded in the memory without using the generic code for the function; and e) if the specialized code is not recorded in the memory, the microprocessor performs the function using its generic code, wherein the microprocessor is further programmed such that:

when the program is executed, each time the function is performed with the first specific value of the parameter, the microprocessor updates the value of a first counter and, alternately, does not update the value of the first counter if the same function is performed with another value, different from the first specific value, of the parameter;

the microprocessor also executes a) to e) by replacing the first specific value, the first counter, and the first pre-calculated threshold with a second specific value, a second counter, and a second pre-calculated threshold, respectively, the second specific value being different from the first specific value, such that the specialized code that is generated in this case is obtained by specializing the parameter of the function with the second specific value instead of the first specific value, and the microprocessor performs f) calculating the first and second pre-calculated thresholds on the basis of a relationship Kgen/(Klib-Kdyn), wherein:

Kgen is a pre-recorded cost to execute c),

Kdyn is a pre-recorded cost to execute d),

Klib is a pre-recorded cost to execute e), and the costs Kgen, Kdyn and Klib are each respective quantities of a same physical variable with different values or of a combination of different physical variables with different values that varies depending on whether the microprocessor executes d) or e);

when the first pre-calculated threshold is calculated, the costs Kgen, Kdyn, and Klib being costs to execute c), d), and e), respectively, these operations are executed only in a case where the first specific value is used; and when the second pre-calculated threshold is calculated, the costs Kgen, Kdyn, and Klib being costs to execute c), d), and e), respectively, these operations are executed only in a case where the second specific value is used.

* * * * *

UNITED STATES PATENT AND TRADEMARK OFFICE
CERTIFICATE OF CORRECTION

PATENT NO. : 10,140,135 B2  
APPLICATION NO. : 15/740169  
DATED : November 27, 2018  
INVENTOR(S) : Caroline Queva et al.

Page 1 of 1

It is certified that error appears in the above-identified patent and that said Letters Patent is hereby corrected as shown below:

On the Title Page

Item (57) ABSTRACT, Line 9, insert --,-- after "counter."

Signed and Sealed this  
Eighteenth Day of June, 2019

Andrei Iancu  
*Director of the United States Patent and Trademark Office*